United States Patent [19]
Paweletz

[11] Patent Number: 5,637,941
[45] Date of Patent: Jun. 10, 1997

[54] SHAFTLESS SPINNING ROTOR FOR AN OPEN-END SPINNING MACHINE

[75] Inventor: Anton Paweletz, Fellbach, Germany

[73] Assignee: SKF Textilmaschinen-Komponenten GmbH, Stuttgart, Germany

[21] Appl. No.: 350,830

[22] Filed: Dec. 7, 1994

[30] Foreign Application Priority Data

Dec. 14, 1993 [DE] Germany .............. 43 42 583.6

[51] Int. Cl.⁶ .................................................. H02K 7/09
[52] U.S. Cl. ................................................... 310/90.5
[58] Field of Search ........................................ 310/90.5

[56] References Cited

U.S. PATENT DOCUMENTS

| | | | |
|---|---|---|---|
| 4,128,280 | 12/1978 | Purtschert | 310/90.5 |
| 4,970,422 | 11/1990 | Lind | 310/90.5 |
| 5,196,748 | 3/1993 | Rigney | 310/90.5 |
| 5,218,257 | 6/1993 | Tozoni | 310/90.5 |
| 5,319,275 | 6/1994 | Tozoni | 310/90.5 |
| 5,385,007 | 1/1995 | Hartel et al. | 310/90.5 X |

FOREIGN PATENT DOCUMENTS

| | | |
|---|---|---|
| 0190440A2 | 12/1985 | European Pat. Off. . |
| 1202392 | 7/1961 | Germany . |
| 3325985C2 | 7/1983 | Germany . |
| 4104250A1 | 2/1991 | Germany . |
| 372880 | 7/1961 | Switzerland . |
| WO92/01097 | 1/1992 | WIPO . |

*Primary Examiner*—Mark O. Budd
*Attorney, Agent, or Firm*—Shefte, Pinckney & Sawyer

[57] ABSTRACT

A shaftless spinning rotor for an open-end spinning machine is adapted to operate as a rotor driven by a stator in an axial field motor supported thereon by a combined magnetic and gas bearing producing separate magnetic fields for guiding orientation of the rotational axis of the rotor and for driving rotation thereof which achieves smooth substantially non-oscillating operation with minimal heating in the region of the axis of rotation by interposing a barrier layer with nonmagnetic properties between respective means for conducting the magnetic flux of the driving and guiding magnetic fields for decoupling the magnetic fields. In particular, separate yokes are utilized for conducting the fluxes of the driving and guiding magnetic fields and permanent magnets are primarily used to generate the magnetic fields.

8 Claims, 1 Drawing Sheet ic field for driving rotation of the rotor about
the axis. A first means is provided for conducting the
magnetic flux for the guiding magnetic field, while a second
means conducts the magnetic flux for the driving magnetic
field. According to the present invention, a generally non-
magnetic barrier layer is disposed between the first and
second flux conducting means for decoupling of the respec-
tive fluxes.

SHAFTLESS SPINNING ROTOR FOR AN OPEN-END SPINNING MACHINE

FIELD OF THE INVENTION

The present invention relates to a shaftless spinning rotor for an open-end spinning machine, which is embodied as the rotor of an axial field motor with means for creating a magnetic field for driving rotation of the spinning rotor and another magnetic field for guiding the spinning rotor. More particularly, the spinning rotor of the present invention has a bearing face remote from the spinning chamber of the spinning rotor adapted to form a combined magnetic and gas bearing and means for conducting the magnetic flux for the driving and guiding magnetic fields.

BACKGROUND OF THE INVENTION

As development of rotor spinning machines progresses, the goal is not only to improve the quality of the yarns produced, but above all to increase production capacity. A key factor in increasing production capacity is the rotary speed of the spinning rotor. For this reason, varied kinds of drives and bearings for spinning rotors have been developed, in order to reach rotary speeds of markedly over 100,000 rpm. Reducing the rotor diameter and mass and lowering friction losses enables not only greater rotary speed but also reduced energy consumption when driven.

In this respect, a shaftless spinning rotor, which is embodied as the rotor of an axial field motor, can be considered especially advantageous by providing a combined magnetic and gas bearing which assures relatively low friction losses.

A shaftless open-end spinning rotor of the above-described type having a combined magnetic and gas bearing is known from International PCT Patent Reference WO 92/01097, which discloses a rotor having a bearing face, remote from the spinning chamber of the spinning rotor, and means for conducting the magnetic flux for the driving and guiding magnetic fields. By means of the guiding magnetic field, the rotational axis of the open-end spinning rotor is to be rigidly defined and maintained during rotation. However, it has been found impossible to achieve significant suppression of impermissible vibratory, wobbling and oscillating motions that occur particularly in critical rpm ranges. Moreover in the central region of the stator of the axial field motor, overheating tends to occur which causes thermal expansion and can ultimately lead to problematic warping.

SUMMARY OF THE INVENTION

It is accordingly an object of the present invention to improve the known type of shaftless spinning rotor described above to achieve a smoother, balanced rotational operation without problematic vibration, oscillation or wobbling and with reduced generation of heat in the region of the rotational axis.

Briefly summarized, this object is attained in accordance with the present invention in a shaftless spinning rotor for an open-end spinning machine of the type adapted to be operable in an axial field motor to be driven rotatably by a stator of the motor. The rotor comprises a body defining a spinning chamber and an opening into the chamber, with a bearing face disposed opposite the rotor opening. Means are provided for producing a combined magnetic and gas bearing for supporting the rotor relative to the stator, including means for producing a first field of magnetic flux for orienting and maintaining a rotational axis of the rotor in a stationary disposition and means for producing a second field of magnetic flux for driving rotation of the rotor about the axis. A first means is provided for conducting the magnetic flux for the guiding magnetic field, while a second means conducts the magnetic flux for the driving magnetic field. According to the present invention, a generally non-magnetic barrier layer is disposed between the first and second flux conducting means for decoupling of the respective fluxes.

The invention is based on the recognition that the magnetic fields of the axially symmetrical driving magnets have a component that changes with time and spatially which impairs the constant magnetic field of the guiding magnets. Superimposing the fields on one another, as in the prior art, results in an asymmetrical field intensity distribution in the center of the spinning rotor. For example, while the magnetic field lines between the driving magnets extend in the same direction over the central region in which the guiding magnets are disposed, the direction of the magnetic field lines of the guiding magnets is opposite on opposed sides of the axis of rotation. This causes a backup of magnetic flux on one side, and possibly even a magnetic saturation, while on the opposite side mutual attenuation of the magnetic fields occurs. By coupling the magnetic fluxes of the drive and guide magnet fields, the action of the stator current causes a constant magnetic reversal in the region of the guide magnets.

In contrast, by providing a barrier layer for decoupling the respective magnetic fluxes, the influence of the alternating component of the driving magnetic field in the central region, i.e., in the region of the guiding magnetic field, is minimized. As a result, eddy currents in the rotational frequency of the rotor, particularly on the stator side, can be reduced significantly. Such eddy currents can become dangerous especially if the central part of the stator gas bearing has metal elements. Moreover, an asymmetrical magnetization of the central region of the guiding magnetic field, and hence an undesirable shift in the magnetic axis, is avoided. Such a shift leads directly to a deviation between the mechanical axis of rotation about the center of gravity of the rotor and the magnetic axis intended to be defined by adjusting the rotor to a minimum of the magnetic potential of the field. In turn, any deviation between the two axes leads to the wobbling and oscillatory motion found in the prior art.

Advantageously, separate yokes, which are separated from one another by the aforementioned barrier layer, are used to conduct the respective magnetic fluxes of the driving magnets and the guiding magnets. Although hysteresis material can also be used on the rotor in order to effect rotational guiding and driving thereof, it is advantageous to use a concentric or symmetrical arrangement of permanent magnets for the drive and guide magnet fields. The respective yokes may be spaced apart both axially and radially from one another, with the barrier layer disposed in the space therebetween.

In one embodiment, the arrangement of magnets that generate the guiding magnetic field protrude from the flat bearing face of the spinning rotor and extends into a corresponding recess in the stator, which advantageously allows a reduction in the axial length of the main body of the spinning rotor, even if the two yokes for the guiding and driving magnets are spaced apart axially. With respect to the magnetic flux of the magnetic field of the drive magnets, a yoke that extends past the central region has more favorable properties. Moreover, in this case the yoke toward the rotor for the driving magnetic field is located closer to the stator windings, with the overall result that the length of the magnetic field lines is shortened. An especially favorable configuration of the magnets for generating the guiding magnetic field is obtained by the disposition of one central, disklike magnet, and one concentric, annular magnet of opposite polarity spaced annularly therefrom. In this manner, the guiding magnetic arrangement can cooperate with an identical magnet arrangement but of reverse polarity to achieve both good holding action and good centering action.

The invention also contemplates joining the yokes directly to their respective magnets without anything between them to minimize any hindrance on, and thereby optimize the strength of, their magnetic flux.

The arrangement of magnets protruding from the bearing face of the rotor for generating the guiding magnetic field can be achieved especially favorably if the associated yoke is located in the same plane with the main portion of the bearing of the spinning rotor.

DESCRIPTION OF THE PREFERRED EMBODIMENTS

Figure 1:
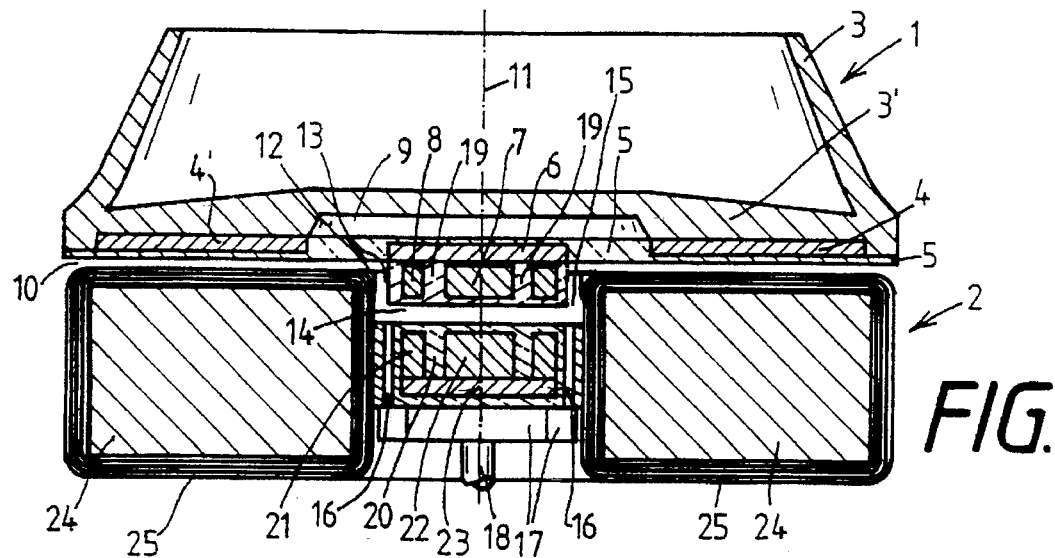
FIG. 1 is an axial cross-section through an assembly of a shaftless open-end spinning rotor as preferably embodied according to the present invention as the rotor in an axial field motor.

Referring now to the accompanying drawings and initially to FIG. 1, a shaftless spinning rotor 1 according to the present invention is embodied as the rotor of an axial field motor in assembly with a stator 2 of the motor. The main body of the spinning rotor 1 forms a spinning cup 3 open at its top with a circular disk-like base 3' from which an annular outer wall extends to define a spinning chamber therewithin with an annular fiber collecting groove 3" extending circumferentially at the juncture of the base 3' and the annular wall, this structure of the rotor 3 being concentric about and defining an axis of rotation 11. As is known in open-end spinning, opened individualized fibers are fed into the chamber to collect centrifugally in the groove 3" as a result of driven rotation of the rotor 3 and the collected fibers are progressively drawn from the spinning chamber to form a yarn or thread. The means by which fibers are delivered into the chamber and the means by which the yarn is withdrawn from the chamber are known but are not shown for the sake of simplicity in that elements do not have any influence on the subject of the present invention.

Drive magnets 4 and 4', which by way of example may comprise segmental axially symmetrical magnet plates of alternating polarity, are mounted concentrically about the rotational axis between the underside of the rotor base 3' and a magnet carrier 5 affixed thereto, which forms a bearing face of the rotor. The magnet carrier 5 may be made up for example of solid laminates as known from International PCT Patent Disclosure WO 92/01097. In the simplest case, two drive magnets 4,4' suffice, which are magnetically insulated from one another in the plane of the bearing face. However, since this magnet arrangement is already described in WO 92/01097, it need not be described in further detail herein.

An assembly of a centering magnet 7 and a magnet ring 8, supported in spaced relation from one another by an insulating holder 19, is mounted to the underside of the magnet carrier 5 on the spinning rotor 1 to protrude downwardly from the bearing face into a recess of the stator 2, forming therebetween an axial air gap 14 and a radial air gap 15.

Axially adjacent the air gap 14 toward the stator is a corresponding magnet arrangement comprising a central magnet 22 and a ring magnet 21 supported in spaced apart relation to one another by an insulating holder 20. The polarity of the magnets 21,22 in the region of the air gap 14 is opposite the polarity of the magnets 7,8 on the rotor side resulting in mutual attraction of the magnets, whereby the magnets create magnetic fields adapted to guide or retain the rotor 1 axially aligned with the stator 2.

Yoke disks 6,23 are disposed to extend radially with respect to the magnet assemblies at the sides of the respective magnet assemblies opposed to the air gap 14, for conducting the magnetic fluxes. At least on the side toward the stator, the yoke disk 23 can rest directly on the magnets 21,22, because this magnet arrangement is stationary, and accordingly no special demands for retention need to be made of its supporting and insulating layer 20. However, it is also possible on the side toward the rotor to secure the magnets 7,8 to their yoke 6 by an adhesive bond. In that case it is not necessary for a portion of the supporting and insulating layer 19 also to extend between the magnets 7,8 and the yoke 6.

The yoke 6 for the guiding magnetic fields of the spinning rotor 1 is joined to the spinning cup 3 via the aforementioned magnet carrier 5 together with the drive magnets 4,4'. For soft-magnetic short circuiting of the drive magnets 4,4', the base 3' of the spinning cup 3 is used directly as a yoke for conducting the magnetic flux of the magnets 4,4' and therefore comprises a ferromagnetic material. The drive magnets 4,4' are glued to the rotor base 3'. The yoke 6 for the magnets 7,8 of the guiding magnetic field is spaced axially from the rotor base 3 acting as a yoke for the drive magnets 4,4' by means of a suitably wide air gap 9 to form a barrier layer which is adequate to decouple the driving and guiding magnetic fields from one another. The alternating component of the rotary driving magnetic field therefore has no significant influence on the guiding magnetic field. This decoupling of the magnetic fields not only markedly reduces the production of eddy currents in the region of the rotational axis 11 but also prevents the magnetic and the mechanical axes of rotation from "moving apart", which would lead to oscillation of the rotor 1.

The main component of the stator 2 is a stator winding 25 with an annular soft iron core 24. As already mentioned, the magnet arrangement on the stator side of the magnets 21,22 for the guide magnet fields is provided inside this ring formed by the soft iron core 24 and stator winding 25. Air nozzles 16 open axially through the holder 20 into the air gap 14 to inject air. thereinto. The air nozzles 16 are supplied with air through an annular conduit 17 which communicates with a source of compressed air, not shown, via a connecting line 18. As a result of the outflowing air, the air gap 14 is always maintained appropriately between the spinning rotor 1 and stator 2 counter to the magnetic force of attraction of the magnets 7,8,21,22 for averting direct contact between their opposed bearing faces. The air emerging from the air nozzles 16 flows from the axial gap 14 annularly into the radial gap 15 and outwardly therefrom radially through an air gap 10 between the rotor 1 and the stator 2, thereby achieving a uniform air cushion over the entire bearing face 5 of the rotor 1. The air pressure and air quantity should be adapted to the magnetic force so that, in the main bearing region, i.e., between the annular arrangement of the stator winding 25 and the opposite face 5 of the spinning rotor 3, the air gap 10 is maintained at a width in the range of a few hundredths of a millimeter. In this manner, the air consumption can be kept within feasible limits, and the magnetic interaction between the spinning rotor 1 and the stator 2 can be maximized, while achieving adequate security against direct contact of the bearing faces.

The air gap 14, which is somewhat wider than the air gap 10, prevents dimensional deviations in the magnet arrangements for the guide magnet fields, resulting for instance from heating due to eddy currents induced by way of harmonics, from having any negative consequences on the operation of the rotor 1. Above all, however, it can be assured that the vulnerable nozzle arrangement of the air nozzles 16 is protected in every case.

The radial air gap 15 is defined by two security faces 12,13 formed respectively as wearproof surfaces on the radially outward surface of the holder 19 and the radially inward surface of the stator 2, to be operative upon startup of the rotor 1 to serve the purpose of radially securing the position of the spinning rotor 1.

Although normally the guiding magnetic fields reliably assure centering of the spinning rotor 1, a sudden imbalance of the rotor or soiling in the region of the bearing face 5 can cause shifting of the axis of rotation under extreme conditions. In that case, the startup security faces 12,13 assure that the deflection of the rotor will be kept within narrow limits. The annular arrangement of the air nozzles 16 and the emergence of the air into the air gap 15 assure that, beyond the magnetic centering, centering of the spinning rotor takes place without contact of the startup security faces 12,13 with one another.

Compared with a known arrangement of annular startup security faces surrounding the outer periphery of the rotor, the advantage in the present invention is that the peripheral speed of the startup security face 13 on the rotor is markedly lower at the same rpm because of the substantially smaller radius, and accordingly the coefficients of friction are significantly lower than those in the known rotors.

The width of the air gap 14 should not be substantially greater than that of the air gap 10, because of the magnetically insulating properties of the air in the gap 14. However, opposed magnet poles can be expected normally to face one another and there should not be any preconditions for deflecting the magnetic flux by means of some other soft magnetic short circuit. Accordingly, the air gap 9 has a substantially greater magnetic insulative effect than the air gap 14, since the air gap 9 separates self-contained magnetic fields by means of magnetic short circuiting.

Figure 2:
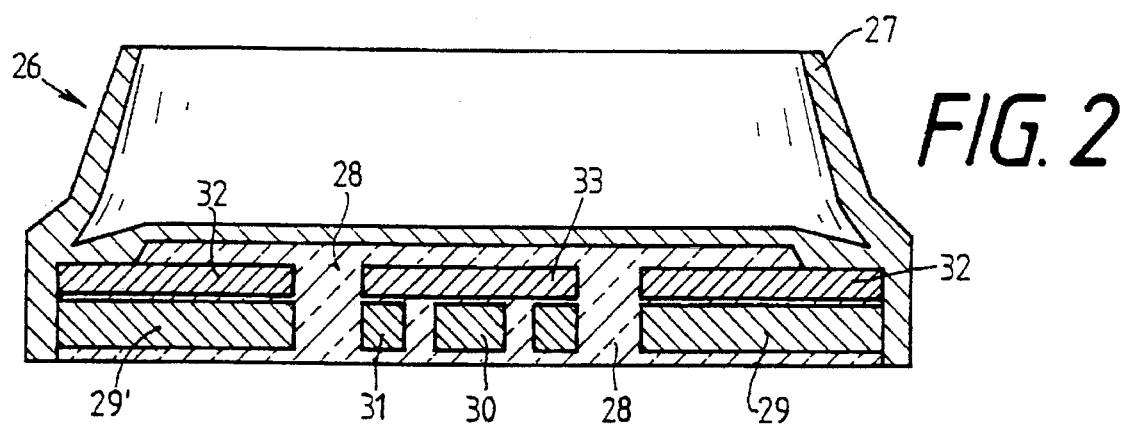
FIG. 2 is another cross-section axially through a shaftless spinning rotor according to an alternate embodiment of the present invention.

In the embodiment of the invention shown in FIG. 2, the base of the spinning cup 27 of the spinning rotor 26 does not serve as a yoke for the drive magnets 29,29', in contrast to the first embodiment. The spinning cup 27 can therefore be entirely made of a material that has no magnetic conductivity, such as aluminum.

The drive magnets 29, 29', guide magnets in the form of a central magnet 30 and a ring magnet 31, as well as a yoke 32 for the drive magnets 29, 29' and a yoke 33 for the guide magnets 30, 31, are all embedded in a layer of a supporting and insulating material 28. The insulating function of this supporting and insulating layer 28 is to decouple from one another the respective magnetic fields of the drive magnets 29,29' and the guiding magnets 30,31 that perform different tasks. The yoke 32 is annular in design, so that it is disposed in the same plane as the yoke 33 for the guide magnet fields, and there is merely a mutual radial spacing between the respective yokes 32,33 within which the supporting and insulating layer 28 is disposed. The spacings between the magnets and their respective yokes are very slight, so that the supporting and insulating layer 28 located between them does not significantly impair the magnetic flux in that region. Moreover, no other kind of soft magnetic short circuiting is present, and the magnetic flux takes the shortest course.

Figure 3:
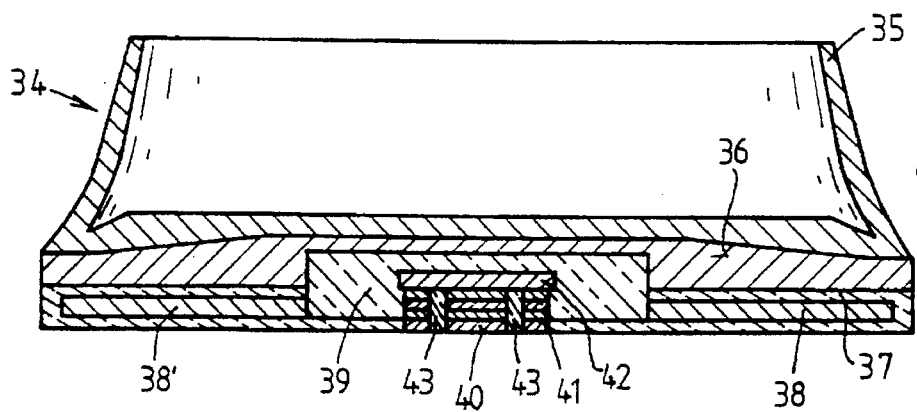
FIG. 3 is another axial cross-section of a shaftless spinning rotor according to a further embodiment of the present invention.

In a third embodiment shown in FIG. 3, another spinning rotor 34 is shown which is formed with a spinning cup 35 made of a magnetically nonconductive material. A separate yoke 36 for the driving magnetic field of the drive magnets 38,38' is secured to the underside of the rotor base, preferably by means of an adhesive bond.

By means of an insulating layer 39, the yoke 36 for the drive magnets 38,38' is separated both axially and radially from guide magnets, i.e., a central magnet 40 and a ring magnet 41, and their associated yoke 42. An annular magnetically insulating layer 43 is also provided between the two guide magnets 40 and 41. These components, i.e., the drive magnets 38,38', the guide magnets 40,41, the yoke 42 and the insulating layer 43, are positioned relative to one another and secured to the yoke 36 for the driving magnetic fields by means of a supporting layer 37.

In the last two exemplary embodiments, a continuously flat bearing face is provided which advantageously faces toward the stator which, in turn, likewise has an entirely flat bearing face. Depending on the number and disposition of magnets, one or more self-contained driving magnetic fields and one or more guiding magnetic fields are produced. As will thus be understood, it is possible within this scope of the invention to dispose a plurality of sectorlike pairs of driving magnets on the spinning rotor. It is also possible to expand the concentric arrangement of the guiding magnets.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A shaftless spinning rotor for an open-end spinning machine, adapted to be operable in an axial field motor to be driven rotatably by a stator of the motor, the rotor comprising a body defining a spinning chamber and an opening into the chamber, a bearing face opposite the rotor opening, and means for producing a combined magnetic and gas bearing for supporting the rotor relative to the stator including a concentric arrangement of permanent magnets for producing a field of magnetic flux for orienting and maintaining a rotational axis of the rotor in a stationary disposition, one pair of permanent magnets symmetrically disposed at a radial spacing from one another outwardly of the concentric arrangement of permanent magnets for producing a driving field of magnetic flux for driving rotation of the rotor about the axis, first means for conducting the magnetic flux for the guiding magnetic field, second means for conducting the magnetic flux for the driving magnetic field, and a generally nonmagnetic barrier layer disposed between the first and second flux conducting means for decoupling of the respective fluxes.

2. The shaftless spinning rotor of claim 1, wherein each magnetic flux conducting means comprises a yoke disposed for joining magnetic poles of the respective magnetic flux field.

3. The shaftless spinning rotor of claim 2, wherein the respective yokes comprise concentric disks disposed at a radial spacing to one another.

4. The shaftless spinning rotor of claim 2, wherein the respective yokes comprise concentric disks disposed at an axial spacing to one another.

5. The shaftless spinning rotor of claim 1, wherein the permanent magnets of the guiding magnetic field protrude from the bearing face of the spinning rotor symmetrically with respect to the axis of the rotor and are dimensioned to be received in a corresponding recess in an opposed bearing face of the stator with an air gap therebetween.

6. The shaftless spinning rotor of claim 1, wherein the permanent magnets for producing the guiding magnetic field comprise a central disklike magnet and a concentric annular magnet of opposite polarity spaced annularly therefrom.

7. The shaftless spinning rotor of claim 1, wherein the first magnetic flux conducting means comprises a yoke disposed for joining magnetic poles of the respective magnetic flux field and the permanent magnets for producing the guiding magnetic field are joined directly by the yoke.

8. The shaftless spinning rotor of claim 5, wherein the yoke for the permanent magnets for producing the guiding magnetic field comprises a yoke face which is essentially disposed in the same plane as the bearing face of the spinning rotor.

* * * * *